United States Patent
Sewall et al.

(10) Patent No.: US 12,193,602 B2
(45) Date of Patent: Jan. 14, 2025

(54) ROTISSERIE SPIT

(71) Applicant: Linwood Resources, LLC, St. Paul, MN (US)

(72) Inventors: David O. Sewall, St. Paul, MN (US); David R. Cleveland, Big Sky, MT (US)

(73) Assignee: Linwood Resources, LLC, St. Paul, MN (US)

( * ) Notice: Subject to any disclaimer, the term of this patent is extended or adjusted under 35 U.S.C. 154(b) by 0 days.

(21) Appl. No.: 18/376,395

(22) Filed: Oct. 3, 2023

(65) Prior Publication Data

US 2024/0023753 A1    Jan. 25, 2024

Related U.S. Application Data

(63) Continuation of application No. PCT/US2022/023369, filed on Apr. 4, 2022.

(60) Provisional application No. 63/170,960, filed on Apr. 5, 2021.

(51) Int. Cl.
*A47J 37/04* (2006.01)
*A47J 37/07* (2006.01)

(52) U.S. Cl.
CPC ......... *A47J 37/041* (2013.01); *A47J 37/0745* (2013.01); *A47J 37/0786* (2013.01)

(58) Field of Classification Search
CPC ... A47J 37/041; A47J 37/0745; A47J 37/0786
See application file for complete search history.

(56) References Cited

U.S. PATENT DOCUMENTS

| | | | |
|---|---|---|---|
| 2,940,380 A * | 6/1960 | Rampel | A47J 37/047 99/341 |
| 3,276,440 A | 10/1966 | Sazegar | |
| 3,809,058 A | 5/1974 | Becker | |
| 5,148,737 A * | 9/1992 | Poulson | A47J 37/0641 99/335 |
| 2009/0025574 A1 * | 1/2009 | Byrnes | A47J 37/0704 426/523 |
| 2009/0308373 A1 | 12/2009 | Scott et al. | |
| 2010/0095946 A1 | 4/2010 | Creel | |
| 2010/0258105 A1 | 10/2010 | Simms, II | |
| 2010/0258106 A1 | 10/2010 | Simms, II | |
| 2013/0319258 A1 * | 12/2013 | Cleveland | A47J 37/042 99/421 R |
| 2014/0021314 A1 | 1/2014 | Bourlier | |

(Continued)

OTHER PUBLICATIONS

International Search Report and Written Opinion of the ISA for PCT/US22/23369, mailed Jun. 30, 2022, 11 pages.

*Primary Examiner* — Nathaniel E Wiehe
*Assistant Examiner* — Keith Brian Assante
(74) *Attorney, Agent, or Firm* — Husch Blackwell LLP (57) ABSTRACT

A ruled rotisserie spit for use in a motorized rotisserie device in a grill. The spit has an elongated spit rod having a central axis and a sharpened tip, a spit rod centerline corresponding to the spit rod center of mass, a food centerline axially displaced from the spit rod centerline and corresponding to a desired midpoint for food that will be grilled using the rotisserie device, and one or more pairs of index marks or other discernible indicia on the spit rod located either side of and equidistant from the food centerline.

20 Claims, 4 Drawing Sheets

(56) References Cited

U.S. PATENT DOCUMENTS

| | | | |
|---|---|---|---|
| 2015/0135970 A1* | 5/2015 | Klev | A47J 37/049 99/421 A |
| 2017/0119209 A1 | 5/2017 | Jenks | |
| 2017/0196398 A1 | 7/2017 | Cleveland et al. | |
| 2017/0343331 A1* | 11/2017 | Drury, Sr. | G01B 3/1003 |
| 2019/0082883 A1* | 3/2019 | Jones | A47J 37/041 |

* cited by examiner

ROTISSERIE SPIT

CROSS REFERENCE TO RELATED APPLICATION

This application is a continuation under 35 U.S.C. § 111(a) of International Patent Application No. PCT/US2022/023369, filed Apr. 4, 2022, and entitled "Ruled Rotisserie Spit", which claims the benefit of U.S. Provisional Application No. 63/170,960, filed Apr. 5, 2021, and entitled "Ruled Rotisserie Spit," the disclosures of which are hereby incorporated by reference in their entirety.

FIELD

This invention relates to rotisserie devices.

BACKGROUND

Many outdoor cooks prefer to grill juicy or fatty foods using a rotisserie. The slowly-turning spit employed in such devices promotes a self-basting action that may provide more even cooking, may retain liquids in the food that might otherwise drip away, may reduce flare-ups and may provide more moist cooked foods.

Hinged, covered ceramic (viz., kamado) charcoal-burning grills have been used for many centuries. Until recently, most such grills were not sold with rotisserie capabilities. However, a wedge-shaped rotisserie adapter sold as the JoeTisserie™ adapter from Kamado Joe of Duluth, Georgia and shown in U.S. Pat. No. 9,603,484 B2 and U.S. Pat. No. 10,925,435 B2 has now become widely used in hinged, covered ceramic grills. As supplied, the JoeTisserie adapter is designed for the Kamado Joe 18 inch Classic series and 24 inch Big Joe™ series grills, but also fits similarly sized circular kamado grills from Big Green Egg and other suppliers of hinged, covered ceramic grills.

Figure 1:
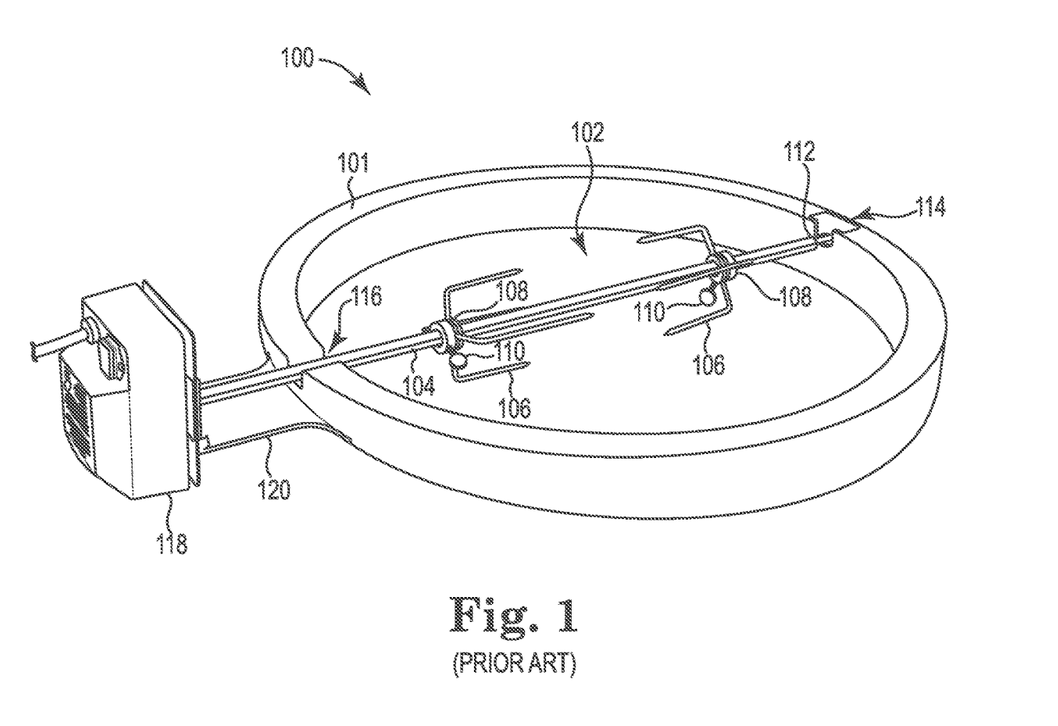
FIG. 1 is a perspective view of a wedge-shaped rotisserie adapter ring for use in hinged, covered grills.

FIG. 1 shows wedge-shaped rotisserie adapter 100 including tapered ring 101 and a motor-driven rotisserie spit 102 including a polygonal (and in this case as well as by convention, square) cross-section spit rod 104 equipped with a pair of removable opposed forks 106. The position and thus the gap between forks 106 may be adjusted by sliding collars 108 along spit rod 104 and tightening thumbscrews 110 when a suitable gap is achieved. This gap normally corresponds to the length of a roast or other meat item that will be grilled using adapter 100. The polygonal cross-section of spit rod 104 helps discourage forks 106 and collars 108 from rotating with respect to spit rod 104 once thumbscrews 110 have been tightened. One end of spit 102 terminates at sharpened cylindrical end 112 which can revolve in recess 114. The other end of spit 102 passes through slot 116 in ring 101 and enters into a corresponding square recess (not shown in FIG. 1) in the output shaft of reduction gear motor 118. Motor 118 is secured with respect to ring 102 by mounting arm 120. When motor 118 is energized, it causes spit 102 to revolve and carry with it a food to be grilled (for example, meats, fish, vegetables, fruits or combination thereof) skewered on spit rod 104 between the forks 106. Although not shown in FIG. 1, the forks 106 may be replaced with a basket that can hold loose meat pieces (e.g., chicken wings) or other food items.

The FIG. 1 rotisserie adapter is generally used outdoors. Although some cooks have outdoor food preparation areas located next to their grill, many cooks prepare food indoors. In either case, the cook typically washes, dries and seasons the food, followed by skewering the food on spit rod 104 between forks 106 and tightening thumbscrews 110. In order to ensure well-balanced, smoothly rotating rotisserie operation, the cook may have to loosen the thumbscrews 106, reposition the collars 108 to compress the forks 106 toward the center of the food, and retighten the thumbscrews 110. Several such adjustments may be required. Doing so can be difficult or time-consuming if skewer 102 is installed in adapter 100 above very hot coals. The cook may be burned while loosening and tightening the thumbscrews 110. To avoid being burned, the cook may instead have to remove skewer 102 from adapter 100 and relocate skewer 102 to a side table or even indoors in order to perform the adjustment.

SUMMARY

Proper positioning of the food along the length of spit rod 104 is important. If the food to be grilled is shifted too far toward one end or the other of the spit, the food or the forks 106 may rub against the ring 101 or against the inside of the grill. Long food items such as large meat roasts can be particularly difficult to position since they may occupy nearly the full available span across the inside diameter of ring 101. The asymmetric nature of spit rod 104, arising in part due to the length of motor mounting arm 120 (and the benefits such length provides in discouraging overheating of motor 118 during grilling), contributes to this difficulty. The cook may find it necessary to make several trial and error attempts to properly position food on spit rod 104 in order to avoid rubbing or other interference with ring 101 or the grill.

The present invention provides, in some embodiments, a rotisserie spit for use in a motorized rotisserie device in a grill, the spit comprising an elongated spit rod having a central axis and a sharpened tip, a spit rod centerline corresponding to the spit rod center of mass, a food centerline axially displaced from the spit rod centerline and corresponding to a desired midpoint for food that will be grilled using the rotisserie device, and one or more pairs of index marks or other discernible indicia on the spit rod located either side of and equidistant from the food centerline. In some embodiments the indicia pairs denote distances from the food centerline. In some embodiments the indicia pairs denote distances to the food centerline. In some embodiments the indicia pairs denote distances to a feature or features of the rotisserie device that may interfere with rotating food during rotisserie grilling. The indicia pairs assist in positioning food and rotisserie forks along the length of the spit and may reduce the need for adjusting or otherwise altering such positioning.

The present invention provides, in additional embodiments, a rotisserie device comprising a support ring for use in a partially opened hinged covered ceramic or metal grill having a base and cover joined by the hinge and a cover handle opposite the hinge, or for use in a partially opened unhinged covered metal kettle charcoal grill having a front-mounted cover handle, wherein the grill has a joinder seam defined by mating surfaces of the grill base and cover when the cover is fully closed and in full normal contact with the base, the device when installed in such a grill having a generally wedge-shaped or trapezoidally-shaped external side profile that tapers from a maximum ring height at a ring location nearest the handle to a minimum ring height at a ring location furthest from the handle and holds the cover and base apart in a partially-opened position while inhibiting airflow into and out of the grill; the device comprising at least one motor mounted outside the ring that drives a removable, rotatable rotisserie spit that bisects or transects the ring, and wherein the spit comprises an elongated spit rod having a central axis and a sharpened tip, a spit rod centerline corresponding to the spit rod center of mass, a food centerline axially displaced from the spit rod centerline and corresponding to a desired midpoint for food that will be grilled using the rotisserie device, and one or more pairs of index marks or other discernible indicia on the spit rod located either side of and equidistant from the food centerline. In some embodiments the above-disclosed devices include a plurality of motors each driving a spit (e.g., two motors driving a total of two spits or three motors driving a total of three spits). In some embodiments the spit or spits are equipped with two or more adjustable inward-facing forks (e.g., for grilling roasts and whole fowl), and in some embodiments the spit or spits are equipped with a basket (e.g., for grilling chicken wings, fish, fruits or vegetables).

The present invention provides, in additional embodiments, a hinged covered ceramic or metal kamado grill, or an unhinged covered metal kettle charcoal grill, the grill comprising a front-mounted cover handle and a joinder seam defined by mating surfaces of the grill base and cover when the cover is fully closed and in full normal contact with the base, and further comprising a rotisserie device comprising a support ring for installation between the grill base and cover, the device when installed in such a grill having a generally wedge-shaped or trapezoidally-shaped external side profile that tapers from a maximum ring height at a ring location nearest the handle to a minimum ring height at a ring location furthest from the handle and which holds the cover and base apart in a partially-opened position while inhibiting airflow into and out of the grill; the device comprising at least one motor mounted outside the ring that drives a removable, rotatable rotisserie spit that bisects or transects the ring, and wherein the spit comprises an elongated spit rod having a central axis and a sharpened tip, a spit rod centerline corresponding to the spit rod center of mass, a food centerline axially displaced from the spit rod centerline and corresponding to a desired midpoint for food that will be grilled using the rotisserie device, and one or more pairs of index marks or other discernible indicia on the spit rod located either side of and equidistant from the food centerline.

The present invention provides, in additional embodiments, a method for outdoor grilling, comprising in either order the steps of a) building a fire from combustible material in the base of a hinged covered ceramic or metal kamado grill, or in the base of an unhinged covered metal kettle charcoal grill, the grill comprising a front-mounted cover handle and a joinder seam defined by mating surfaces of the grill base and cover when the cover is fully closed and in full normal contact with the base, and b) opening the cover, installing in the grill a rotisserie device comprising a support ring for installation between the grill base and cover, the device when so installed having a generally wedge-shaped or trapezoidally-shaped external side profile that tapers from a maximum ring height at a ring location nearest the handle to a minimum ring height at a ring location furthest from the handle and which holds the cover and base apart in a partially-opened position while inhibiting airflow into and out of the grill; the device comprising at least one motor mounted outside the ring that drives a removable, rotatable rotisserie spit that bisects or transects the ring, and wherein the spit comprises an elongated spit rod having a central axis and a sharpened tip, a spit rod centerline corresponding to the spit rod center of mass, a food centerline axially displaced from the spit rod centerline and corresponding to a desired midpoint for food that will be grilled using the rotisserie device, and one or more pairs of index marks or other discernible indicia on the spit rod located either side of and equidistant from the food.

The disclosed devices, grills and methods provide improved rotisserie cooking on hinged, covered kamado grills and unhinged covered metal kettle charcoal grills. The disclosed devices may be sold together with a new grill or as an aftermarket device for an existing grill.

BRIEF DESCRIPTION OF THE DRAWING

Like reference symbols in the various figures of the drawing indicate like elements. The elements in the drawing are not to scale.

DETAILED DESCRIPTION

The recitation of a numerical range using endpoints includes all numbers subsumed within that range (e.g., 1 to 5 includes 1, 1.5, 2, 2.75, 3, 3.80, 4, 5, etc.).

The terms "a," "an," "the," "at least one," and "one or more" are used interchangeably. Thus, for example, a rotisserie spit that includes "a" tined fork means that the spit includes "one or more" tined forks.

The term "aperture" means a hole, slot or other opening.

The term "essentially the same" when used with respect to a numerical measure or quantity means within ±10% and more preferably within ±5% of that measure or quantity.

The term "grill" means a cooking device capable of a variety of cooking tasks including but not limited to grilling, baking, smoking and roasting.

The terms "half" and "halves" when used in reference to a covered grill are approximate, and need not represent a geometric one-half of the total shell surface in a covered grill. An individual half normally will be a lower surrounding shell that serves as a base and holds charcoal or other heat source, or an upper surrounding shell that serves as a cover.

Unless otherwise specified, the term "height" when used in respect to an element of the disclosed support ring refers to the length of a vertical line segment bisecting that element. In some specified contexts the terms "above", "below" or "height" refer to the orientation of an element with respect to another element.

The term "inhibit airflow" when used in reference to the disclosed rotisserie device support ring means the ring will limit substantially or will prevent airflow into and out of a partially opened grill in which the support ring has been installed. The desired degree of airflow inhibition may vary, and desirably will be such as to permit extinguishment of burning coals in an otherwise closed grill due to combustion air starvation. Lesser degrees of airflow inhibition may be tolerated in some circumstances, for example airflow inhibition sufficient to discourage or prevent runaway temperature increases, or airflow inhibition sufficient to permit the temperature in a burning grill to be maintained at or below 149° C. (300° F.), 121° C. (250° F.) or 107° C. (225° F.)

using the adjustable top and bottom dampers normally included with a hinged, covered charcoal-burning grill.

The term "joinder seam" when used in reference to a hinged or unhinged covered grill refers to the parting plane or parting line defined by the mating sealing surfaces of the grill base and cover when the cover is fully closed and its cover sealing surface is in full normal contact with the base sealing surface.

The terms "partially opened" and "partially uncovered" when used in reference to a covered grill, mean that the grill cover has been rotated away from the grill base (and for a hinged, covered grill, through a portion of but not through all of its hinged travel arc), so that the cover and base no longer contact one another through the full extent of their normal sealing surfaces. In such a position the cover and base sealing surfaces may however contact the installed rotisserie device. The terms "partially opened" and "partially uncovered" thus may refer to a covered grill either before or after installation of the disclosed rotisserie device support ring between the grill cover and grill base. These terms will be used whether or not other grill openings (such as the air intake vent normally provided in a grill base, or the combustion product exhaust vent normally provided in a grill cover) are fully or partially open or closed.

The term "ring" when used in reference to the disclosed rotisserie device support ring means a heat-resistant object having a generally open interior portion surrounded by a chock, wall or other grill-contacting portion that when viewed in cross-section from above its normal orientation during use has a continuous or nearly continuous rounded or at least partially rounded cross-sectional shape. Suitable ring shapes include circular shapes like those in the mating halves of a Kamado Joe or Big Green Egg grill, oval shapes like those in the mating halves of a Primo grill (from Primo Grills and Smokers of Tucker, Ga), flattened teardrop shapes like those in the mating halves of a Komodo Kamado OTB grill from Komodo Kamado of Bali, Indonesia (which, it may be noted, includes as supplied a small hole in the base which receives the motorized drive spindle of an accessory rotisserie device), and other functionally similar shapes.

The term "span" when used in reference to the disclosed rotisserie device support ring means the maximum axial length of meat that could be skewered on the spit and rotated without rubbing against the ring.

Figure 2:
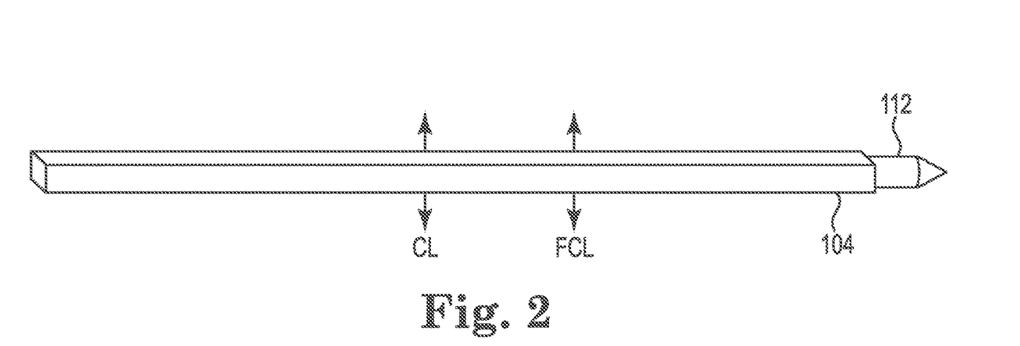
FIG. 2 is a perspective view of the FIG. 1 rotisserie spit rod.

FIG. 2 shows the asymmetric nature of spit rod 104. Spit rod centerline CL designates the center of mass for spit rod 104, and food centerline FCL designates the midpoint at which food on spit rod 104 would desirably be centered in order to be equidistant from recess 114 and slot 116. For use in an 18 inch nominal cooking grid diameter Kamado grill, spit rod 104 has a length of about 24 inches (about 610 mm) and the sharpened cylindrical end section 112 has a further length of about 1 inch (about 25 mm). Spit rod centerline CL is about 12 inches (about 305 mm) from the motor-driven end of spit rod 104, and food centerline FCL is about 15 inches (about 380 mm) from the motor driven end. Food centerline FCL consequently is axially displaced from the spit rod centerline CL by about 3 inches (about 75 mm).

Figure 3:
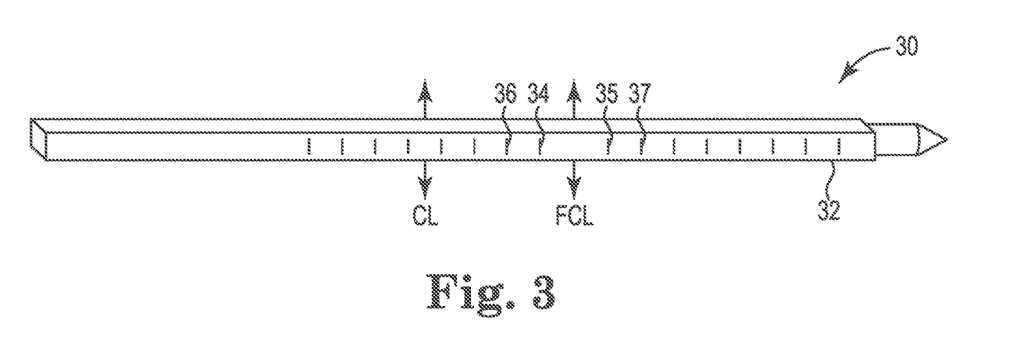
FIG. 3 is a perspective view of an embodiment of a ruled rotisserie spit rod.

FIG. 3 shows a rotisserie spit 30 in accordance with the present disclosure, and with the spit forks or spit basket omitted for clarity. Spit 30 includes spit rod 32 which may be made by modifying spit rod 104 to add a plurality of paired index marks (34 and 35; 36 and 37; and so on) extending outwardly from both sides of food centerline FCL toward the extremities of spit rod 32. The index marks may be line segments (as shown in FIG. 3), stars, circles, dimples or any other convenient and easily-formed shape, and may be made by stamping, machining, laser etching or any of a variety of other techniques that will be familiar to persons having ordinary skill in the metalworking art. The marks may be applied to any one or more of the side surfaces of spit rod 32. The marks provide discernible indicia on the spit rod located either side of and equidistant from the food centerline FCL and thus facilitate proper positioning of food to be grilled and the adjustable forks or basket that can be used to secure such food.

Figure 4:
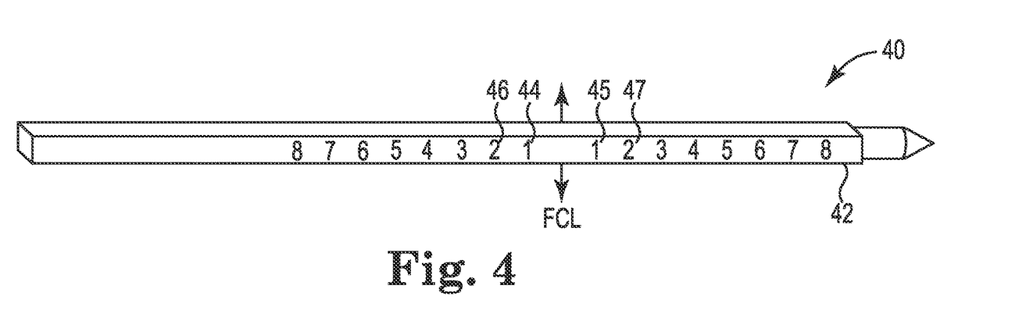
FIG. 4 through FIG. 7 are perspective views of additional embodiments of the disclosed ruled rotisserie spit rod.

FIG. 4 shows another rotisserie spit 40 in accordance with the present disclosure. Spit rod 42 may be made by modifying spit rod 104 to add a plurality of successively increasing numerals (e.g., numerals 1 identified as 44 and 45, numerals 2 identified as 46 and 47, and so on) numbered outwardly from both sides of food centerline FCL toward the extremities of spit rod 42. Like the index marks discussed above, the numerals may be applied to one or more of the side surfaces of spit rod 42, and will provide discernible indicia on the spit rod located either side of and equidistant from the food centerline FCL and thus facilitate proper positioning of food to be grilled and the adjustable forks or basket that can be used to secure such food.

Figure 5:
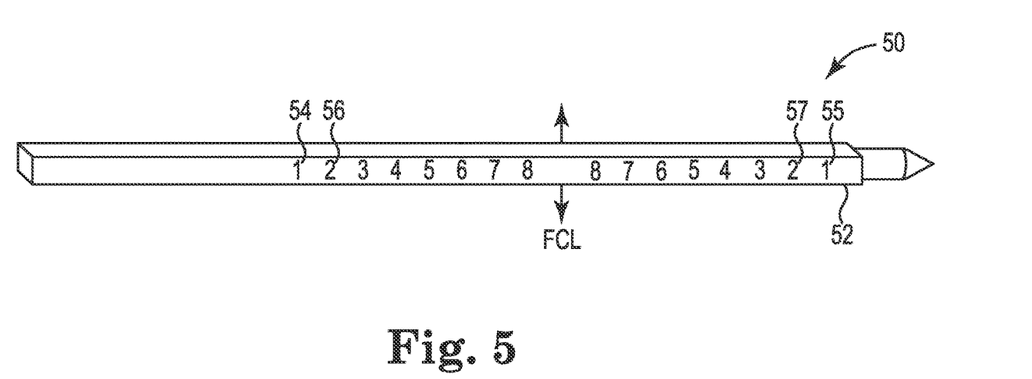

FIG. 5 shows another rotisserie spit 50 in accordance with the present disclosure. Spit rod 52 may be made by modifying spit rod 104 to add a plurality of successively increasing numerals (e.g., numerals 1 identified as 54 and 55, numerals 2 identified as 56 and 57, and so on) numbered beginning with positions on spit rod 52 that will be near the inner diameter of ring 101 and proceeding inwardly towards both sides of food centerline FCL. Like the index marks discussed above, the numerals may be applied to one or more of the side surfaces of spit rod 52, and will provide discernible indicia on the spit rod located either side of and equidistant from the food centerline FCL and thus facilitate proper positioning of food to be grilled and the adjustable forks or basket that can be used to secure such food.

Figure 6:
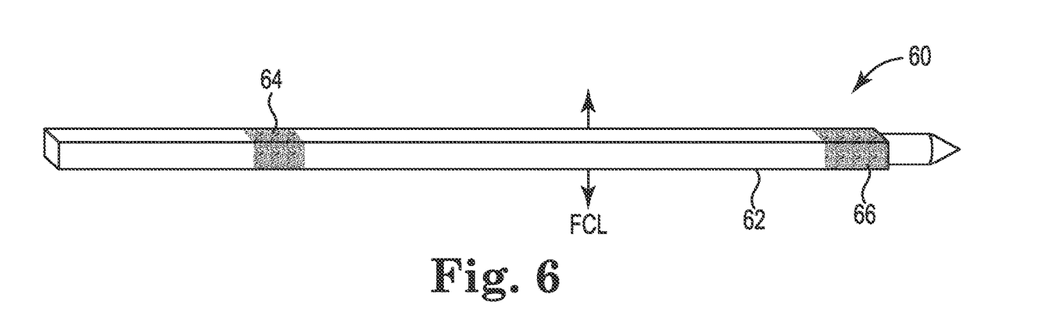

FIG. 6 shows another rotisserie spit 60 in accordance with the present disclosure. Spit rod 62 may be made by modifying spit rod 104 to add a pair of contrasting indicia (64 and 66) at positions on spit rod 62 that will be near the inner diameter of ring 101. Indicia 64 and 66 thus designate the approximate outermost locations for the collars 108 that might be used without causing interference with ring 101 or the grill during rotisserie operation. Indicia 64 and 66 form an area whose color, reflectivity or surface roughness provide visual or tactile contrast to the surrounding or adjacent surfaces of spit rod 62. Such visual or tactile contrast may be formed in a variety of ways, including grinding, polishing, sandblasting, anodizing, metal plating, laser etching, or acid etching. Like the index marks and numerals discussed above, the indicia 64 and 66 may be applied to one or more of the side surfaces of spit rod 62, and will provide discernible indicia on the spit rod located either side of and equidistant from the food centerline FCL and thus facilitate proper positioning of food to be grilled and the adjustable forks or basket that can be used to secure such food.

Figure 7:
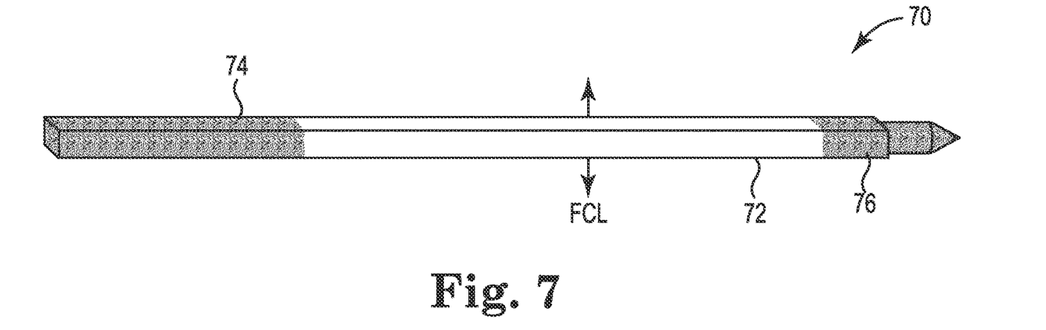

FIG. 7 shows another rotisserie spit 70 in accordance with the present disclosure. Spit rod 72 has discernible visual or tactile indicia 74 and 76 that are similar to indicia 64 and 66 but which extend to the extremities of spit 70. Indicia 74 and 76 may be very conveniently made, for example, by dipping each end of spit rod 72 into a bucket of acid, anodizing solution, or other etching or coloring substance in order to identify the positions on spit rod 72 that will be near the inner diameter of ring 101. Like indicia 64 and 66, indicia 74 and 76 thus designate the approximate outermost locations for the collars 108 that might be used without causing interference with ring 101 or the grill during rotisserie operation. Like the index marks and numerals discussed above, the indicia 74 and 76 may be applied to one or more of the side surfaces of spit rod 62, and will provide discernible indicia on the spit rod located either side of and equidistant from the food centerline FCL and thus facilitate proper positioning of food to be grilled and the adjustable forks or basket that can be used to secure such food.

The disclosed spit rods may be made from a variety of heat-resistant materials including metals such as aluminum, steel or iron, as well as other materials that will be familiar to persons having ordinary skill in the barbeque grill art. Chrome-plated steel represents an especially desirable material. The disclosed spit rods may be formed in a variety of ways that will be familiar to persons having ordinary skill in the barbeque grill art. The disclosed spit rods need not have a square or even a polygonal cross-section. They could for example have other shapes including round or splined shapes so long as the forks or basket can be adequately secured to the spit rod during rotisserie grilling.

The dimensions of the disclosed spit may be adapted as need be to accommodate various grill models and sizes. For example, Kamado Joe ceramic grills are currently available with a circular cross-sectional shape at the joinder seam and nominal firebox widths of 34 cm (13.5 inches) for the Junior Series, 46 cm (18 inches) for the Classic Series and 61 cm (24 inches) for the Big Joe and Pro Joe Series grills. Big Green Egg grills are currently available with a circular cross-sectional shape at the joinder seam and nominal wire cooking grid diameters of 24 cm (9.5 inches) for the Mini grill, 33 cm (13 inches) for the Small grill, 38 cm (15 inches) for the Medium grill, 46 cm (18.25 inches) for the Large grill, 61 cm (24 inches) for the XL grill and 74 cm (29 inches) for the 2XL grill. The typical grill wall thickness at the mating sealing surfaces for these grills is about 25 cm (1 inch) in the case of a Kamado Joe Classic Series or Big Green Egg Large grill, and with similar, lesser or greater grill wall thicknesses for other size grills. Exemplary other grills that can be used with the disclosed spit include those shown in U.S. Pat. No. 3,276,440 (Sazegar) and U.S. Pat. No. 3,809,058 (Becker), in U.S. Published Patent Application Nos. US 2009/0308373 A1 (Scott et al.), US 2010/0095946A1 (Creel), US 2010/0258105 A1 (Simms, II) and US 2010/0258106 A1 (Simms, II); hinged covered grills from other suppliers including Bayou Classic, Big Steel Keg, Blaze, California Kamado, Char-Broil, Char-Griller, GourmetPot, Grill Dome, Imperial Kamado, Kamado Joe, Komodo Kamado, Meteor, Monolith Grill GmbH, Primo Grills and Smokers, Saffire, SnS Grills and Weber-Stephen Products; and unhinged covered metal kettle charcoal grills from Weber-Stephen Products, Char-Broil and many other suppliers.

Having thus described preferred embodiments of the present invention, those of skill in the art will readily appreciate that the teachings found herein may be applied to yet other embodiments within the scope of the claims hereto attached. The complete disclosure of all patents, patent documents, and publications are incorporated herein by reference as if individually incorporated.

The invention claimed is:

1. A rotisserie spit for use in a motorized rotisserie device in a grill, the spit comprising an elongated removable, rotatable spit rod having a central axis and a sharpened tip, a pair of sliding collars that can be tightened to position on the spit rod a pair of opposed forks that skewer food to be grilled or a basket that can hold loose food items to be grilled, a spit rod centerline corresponding to the spit rod center of mass, a food centerline axially displaced from the spit rod centerline and corresponding to a desired midpoint for food that will be grilled using the rotisserie device, and discernible surface areas near extremities of the spit rod whose color, reflectivity or surface roughness provide visual or tactile contrast to surrounding or adjacent surfaces of the spit rod and denote outermost positions for the collars to avoid rubbing or other interference of the forks or basket with the rotisserie device or grill, wherein the spit rod has a polygonal cross section and side surfaces, and the discernible surface areas are on more than one of the side surfaces, extend to the extremities of the spit rod, and are ground, polished, sandblasted, plated, anodized or etched.

2. A rotisserie spit according to claim 1, wherein the discernible surface areas are on all of the side surfaces.

3. A rotisserie spit according to claim 2, wherein the discernible surface areas are ground to provide the discernible areas.

4. A rotisserie spit according to claim 2, wherein the discernible surface areas are anodized to provide the discernible areas.

5. A rotisserie spit according to claim 2, wherein the discernible surface areas are acid etched to provide the discernible areas.

6. A rotisserie spit according to claim 1, wherein the discernible surface areas assist in positioning food and the opposed forks along the length of the spit and reduce the need for adjusting or otherwise altering such positioning.

7. A rotisserie spit according to claim 1, wherein the spit comprises two adjustable forks.

8. A rotisserie spit according to claim 1, wherein the spit comprises a basket.

9. A rotisserie spit according to claim 1, wherein the spit rod comprises steel.

10. A rotisserie spit according to claim 1, wherein the spit rod is chrome-plated.

11. A rotisserie spit according to claim 1, wherein the spit rod has a square cross-section.

12. A rotisserie spit according to claim 1, wherein the distance between the discernible surface areas is 33 to 74 cm.

13. A rotisserie device comprising a support ring for use in a partially opened hinged covered ceramic or metal grill having a base and cover joined by the hinge and a cover handle opposite the hinge, or for use in a partially opened unhinged covered metal kettle charcoal grill having a front-mounted cover handle, wherein the grill has a joinder seam defined by mating surfaces of the grill base and cover when the cover is fully closed and in full normal contact with the base, the device when installed in such a grill having a generally wedge-shaped or trapezoidally-shaped external side profile that tapers from a maximum ring height at a ring location nearest the handle to a minimum ring height at a ring location furthest from the handle and holds the cover and base apart in a partially-opened position while inhibiting airflow into and out of the grill; the device comprising at least one motor mounted outside the ring that drives a removable, rotatable rotisserie spit that bisects or transects the ring, and wherein the spit comprises an elongated removable, rotatable spit rod having a central axis and a sharpened tip, a pair of sliding collars that can be tightened to position on the spit rod a pair of opposed forks that skewer food to be grilled or a basket that can hold loose food items to be grilled, a spit rod centerline corresponding to the spit rod center of mass, a food centerline axially displaced from the spit rod centerline and corresponding to a desired midpoint for food that will be grilled using the rotisserie device, and discernible surface areas near extremities of the spit rod whose color, reflectivity or surface roughness provide visual or tactile contrast to surrounding or adjacent surfaces of the s pit rod and denote outermost positions for the collars to avoid rubbing or other interference of the forks or basket with the ring or grill, wherein the spit rod has a polygonal cross section and side surfaces, and the discernible surface areas are on more than one of the side surfaces, extend to the extremities of the spit rod, and are ground, polished, sandblasted, plated, anodized or etched.

14. A rotisserie device according to claim 13, wherein the device is made from cast aluminum.

15. A rotisserie device according to claim 13, wherein the device includes a plurality of motors each driving a spit.

16. A hinged covered ceramic or metal kamado grill, or an unhinged covered metal kettle charcoal grill, the grill comprising a front-mounted cover handle and a joinder seam defined by mating surfaces of the grill base and cover when the cover is fully closed and in full normal contact with the base, and further comprising a rotisserie device comprising a support ring for installation between the grill base and cover, the device when installed in such a grill having a generally wedge-shaped or trapezoidally-shaped external side profile that tapers from a maximum ring height at a ring location nearest the handle to a minimum ring height at a ring location furthest from the handle and which holds the cover and base apart in a partially-opened position while inhibiting airflow into and out of the grill; the device comprising at least one motor mounted outside the ring that drives a removable, rotatable rotisserie spit that bisects or transects the ring, and wherein the spit comprises an elongated removable, rotatable spit rod having a central axis and a sharpened tip, a pair of sliding collars that can be tightened to position on the spit rod a pair of opposed forks that skewer food to be grilled or a basket that can hold loose food items to be grilled, a spit rod centerline corresponding to the spit rod center of mass, a food centerline axially displaced from the spit rod centerline and corresponding to a desired midpoint for food that will be grilled using the rotisserie device, and discernible surface areas near extremities of the spit rod whose color, reflectivity or surface roughness provide visual or tactile contrast to surrounding or adjacent surfaces of the spit rod and denote outermost positions for the collars to avoid rubbing or other interference of the forks or basket with the ring or grill, wherein the spit rod has a polygonal cross section and side surfaces, and the discernible surface areas are on more than one of the side surfaces, extend to the extremities of the spit rod, and are ground, polished, sandblasted, plated, anodized or etched.

17. A rotisserie grill according to claim 16, wherein the grill is a hinged covered ceramic kamado grill.

18. A rotisserie grill according to claim 16, wherein the grill is a hinged covered metal kamado grill.

19. A rotisserie grill according to claim 16, wherein the grill is an unhinged covered metal kettle charcoal grill.

20. A method for outdoor grilling, comprising in either order the steps of a) building a fire from combustible material in the base of a hinged covered ceramic or metal kamado grill, or in the base of an unhinged covered metal kettle charcoal grill, the grill comprising a front-mounted cover handle and a joinder seam defined by mating surfaces of the grill base and cover when the cover is fully closed and in full normal contact with the base, and b) opening the cover, installing in the grill a rotisserie device comprising a support ring for installation between the grill base and cover, the device when so installed having a generally wedge-shaped or trapezoidally-shaped external side profile that tapers from a maximum ring height at a ring location nearest the handle to a minimum ring height at a ring location furthest from the handle and which holds the cover and base apart in a partially-opened position while inhibiting airflow into and out of the grill; the device comprising at least one motor mounted outside the ring that drives a removable, rotatable rotisserie spit that bisects or transects the ring, and wherein the spit comprises an elongated removable, rotatable spit rod having a central axis and a sharpened tip, a pair of sliding collars that can be tightened to position on the spit rod a pair of opposed forks that skewer food to be grilled or a basket that can hold loose food items to be grilled, a spit rod centerline corresponding to the spit rod center of mass, a food centerline axially displaced from the spit rod centerline and corresponding to a desired midpoint for food that will be grilled using the rotisserie device, and discernible surface areas near extremities of the spit rod whose color, reflectivity or surface roughness provide visual or tactile contrast to surrounding or adjacent surfaces of the spit rod and denote outermost positions for the collars to avoid rubbing or other interference of the forks or basket with the ring or grill, wherein the spit rod has a polygonal cross section and side surfaces, and the discernible surface areas are on more than one of the side surfaces, extend to the extremities of the spit rod, and are ground, polished, sandblasted, plated, anodized or etched.

* * * * *